US006935474B2

(12) United States Patent
Bell et al.

(10) Patent No.: US 6,935,474 B2
(45) Date of Patent: Aug. 30, 2005

(54) COMPRESSED AIR ACTUATED CLUTCH INTERLOCK FOR CLUTCHED POWER TAKE OFF UNIT

(75) Inventors: Joseph A. Bell, Markle, IN (US); Jay E. Bissontz, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/408,712

(22) Filed: Apr. 7, 2003

(65) Prior Publication Data

US 2004/0195069 A1 Oct. 7, 2004

(51) Int. Cl.[7] .................... F16D 67/04; F16D 25/12
(52) U.S. Cl. .................. 192/13 R; 74/11; 192/85 R
(58) Field of Search .................. 192/85 R, 30 W, 192/83, 13 R, 12 C; 74/11, 15.8, 15.82, 15.88

(56) References Cited

U.S. PATENT DOCUMENTS

| | | | | |
|---|---|---|---|---|
| 4,191,270 A | * | 3/1980 | Monteith | 74/11 |
| 4,428,259 A | * | 1/1984 | Kubo et al. | 477/65 |
| 4,722,426 A | * | 2/1988 | Bellanger | 192/85 R |
| 5,237,883 A | * | 8/1993 | Churchill et al. | 74/11 |
| 5,984,070 A | * | 11/1999 | Briggs et al. | 192/85 R |
| 6,482,124 B2 | * | 11/2002 | Hormann et al. | 477/99 |
| 2003/0029691 A1 | * | 2/2003 | Lorentz et al. | 74/11 |

* cited by examiner

Primary Examiner—Rodney H. Bonck
(74) Attorney, Agent, or Firm—Jeffrey Calfa

(57) ABSTRACT

A power take off unit for a motor vehicle equipped with a standard transmission is clutched using compressed air available on the vehicle. Available air pressure is monitored and a clutch interlock implemented through the vehicle electrical control system is made responsive thereto to prevent engagement of the clutch if the load is too heavy for the available air pressure.

8 Claims, 3 Drawing Sheets

COMPRESSED AIR ACTUATED CLUTCH INTERLOCK FOR CLUTCHED POWER TAKE OFF UNIT

BACKGROUND OF THE INVENTION

1. Field of the Invention

The present invention relates to power take off units for motor vehicles and more particularly to compressed air actuated clutch type power take off units.

2. Description of the Problem

Trucks and other commercial vehicles often come equipped with power take off (PTO) units operated at the election of the driver or operator. A (PTO) unit is coupled to the vehicle drive train using a clutch which is pressure actuated. On vehicles equipped with standard (manual) transmissions, compressed air from the vehicle's brake system is often used to close and clamp the PTO clutch. The air pressure available limits the clamping force generated. As a result, the maximum torque available through the clutch is limited by available air pressure. If the clamping force is too low for the PTO load, the clutch will slip resulting in damage to the clutch and a failure to carry the load on the PTO system. In the prior art pressure sensitive cut off valves have been incorporated into an air line between the brake system, compressed air system and the PTO unit to prevent operation of the PTO unit at low pressures.

SUMMARY OF THE INVENTION

According to the invention an air actuated power take off unit is inhibited from operation in response to detection of air pressure in the compressed air supply system falling below a minimum level. The invention is advantageously applied to a motor vehicle equipped with a standard transmission, air brakes, an air brake system pressure monitoring system, and a power take off unit employing a compressed air activated clutch. The clutch is actuated using compressed air from the vehicle's brake system. Pressure sensors for the brake system provide a standard method of monitoring air pressure which is required for the operation of such brakes. Clutch clamping force in the PTO unit is directly related to available air pressure. The interlock monitors air pressure and if air pressure fails to meet a minimum value, PTO operation is inhibited, or if the PTO unit is already engaged, it is disengaged. Under some circumstances the invention may be implemented through modification of body controller software and without hardware modification of the vehicle. Optionally another data link device may be used as a slave of the body controller to implement the invention.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
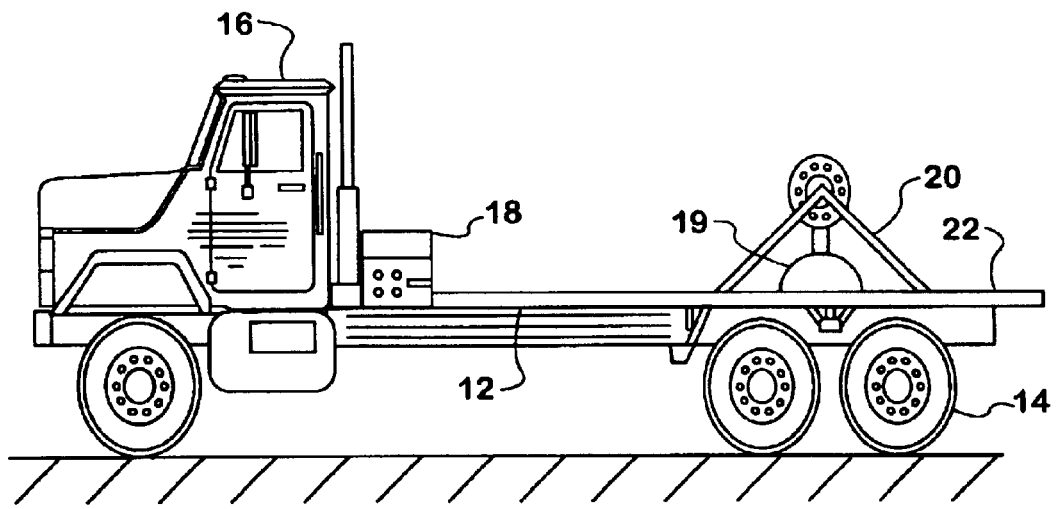
FIG. 1 is a side elevation of a truck equipped with a power take off system.

Referring now to the figures and particularly to FIG. 1, a preferred embodiment of the invention will be described. A conventional flat bed truck 12 rides on a plurality of wheels 14. A driver usually controls the vehicle from a cab 16 positioned in the forward portion of the vehicle. An auxiliary system 20, which may be a winch or other device, is positioned on the flat bed 22 over the rear wheels. The auxiliary systems may take a number of forms, but is one of a class of devices operated by a power take off device (PTO) 19. PTO devices are often powered off of the vehicle drive train where they are engaged to the drive train using a clutch. PTO device 19 is controlled from a panel 18 mounted on the bed just behind cab 16. Panel 18 includes a switch for requesting power take off operation to operate winch 20.

Figure 2:
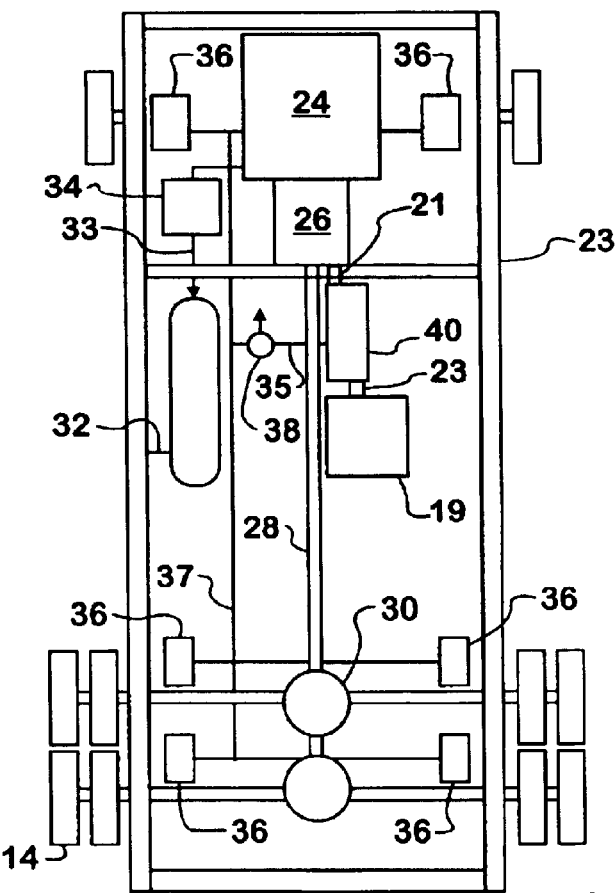
FIG. 2 is a schematic of a truck chassis illustrating some major truck systems.

FIG. 2 illustrates the major vehicle systems involved in implementing the present invention. A thermal engine 24 is longitudinally mounted on the forward end of a chassis 23. Power from the engine 24 is coupled through a standard (i.e. manual) transmission 26 mounted to the rear end of the engine. Propeller shaft 28 is connected between the transmission 26 and a differential 30 in the rear portion of chassis 23. Transmission 26 in turn drives a propeller shaft 28 to propel the vehicle. Engine 24 also powers an air compressor 34 which provides compressed air by an air line 33 to an air storage tank 32. Air compression systems have long been used on trucks and other commercial vehicles to power air brakes 36 and, as described above, air actuated clutches for PTO devices 19. In accord with this practice air lines 37 and 35 are shown connected between air storage tank 32 and the air brakes 36 and air actuated clutch 40, respectively. Air line 35 includes a valve 38 which allows air to pass from tank 32 to clutch 40 or to be exhausted from the clutch. Air actuated clutch has a power input 21 off of standard transmission 26 and an output 23 to PTO device 19. Typically clutch 40 and PTO device 19 are one unit which is referred to as an air clutched PTO.

Figure 3:
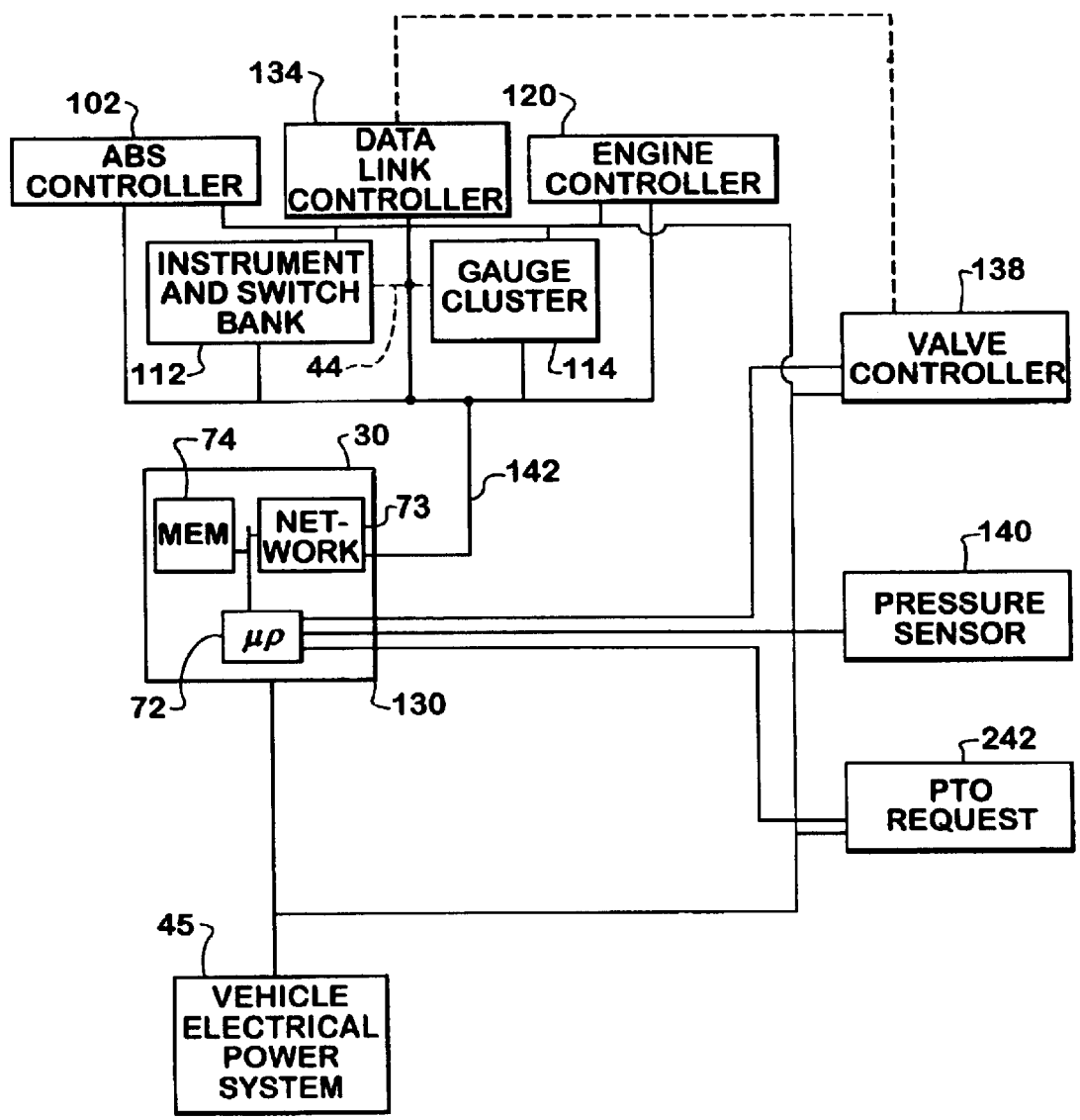
FIG. 3 is a high level block diagram of a vehicle electronic control system.
Figure 4:
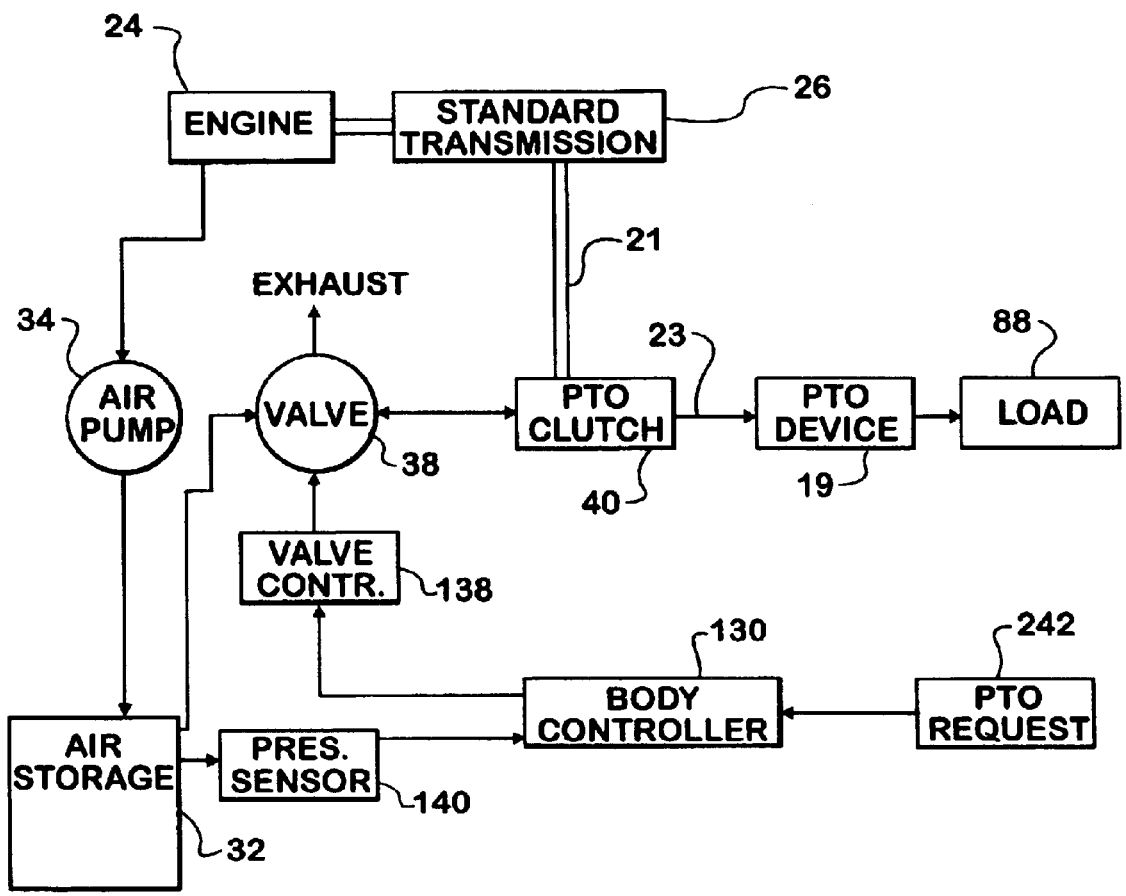
FIG. 4 is a block diagram of an air actuated PTO clutch control arrangement in accordance with a preferred embodiment of the invention.

FIG. 3 is a block diagram of an electronic control system for truck 12. A body controller 130 includes a microprocessor 72, associated memory 74 and a SAE compliant J1939 network interface 73. Body controller 130 coordinates multiplexed transmissions of signals on serial bus 142. Serial bus 142 interconnects an auxiliary instrument and switch bank 112, a gauge cluster 114, an engine controller 20, and anti-lock brake system (ABS) controller 102. Additionally, instrument and switch bank 12 may be connected to cab controller 16 by a private data link 44. All system components are powered by a vehicle electrical power system 45.

Body controller 130 collects data from and issues control signals to discreet devices including a valve controller 138, used to release air from storage to the air actuated clutch to force engagement of the clutch, a pressure sensor 140, used to measure air pressure in tank 32 and a PTO request switch 242, which is typically operator actuated. In some vehicles pressure sensor 140 may be connected to the engine controller 120 and readings therefrom transferred to body controller 130 over serial bus 142. A data link controller 134, if available, may operate as a slave to body controller 130 to operate the PTO valve controller 138. Such a data link controller might be provided by an air solenoid module.

Body controller also periodically determines the pressure in air storage tank 32 using pressure sensor and transmitter 140. PTO clutch 40 is actuated by air from the vehicle's brake system, meaning air tank 32. The air pressure applied to PTO clutch 40 is controlled by a valve 38, which can be positioned to exhaust air from the clutch or to release air from tank 32 to the clutch. Valve 38 is positioned by a valve controller 138, which is typically implemented using a solenoid. Valve controller 138 is in turn responsive to the state of a control signal from body controller 130. Body controller 130 issues a control signal to valve controller 138 for opening the valve to PTO clutch 40 when the pressure sensor 140 signal indicates that sufficient pressure is available to prevent clutch 40 from slipping when PTO device 19 is under load 88. The clamping force of PTO clutch 40 is dependent upon air pressure. PTO clutch 40 has a default disengaged state and thus releases when valve 38 cuts off air pressure. Body controller 38 may be programmed to move valve 38 from applying pressure to cut off should at any time pressure drops below the desired minimum level during PTO operation and body controller may be further programmed to reengage the clutch should air pressure in tank 32 recover to a point above the minimum level.

The present invention simplifies installation of air clutched PTO units on vehicles with standard transmissions, eliminating the need for a pressure sensitive cut off valve in the air line to the air clutched PTO unit. The minimum operating pressure is readily adjusted through changes in programming of the body computer.

While the invention is shown in only one of its forms, it is not thus limited but is susceptible to various changes and modifications without departing from the spirit and scope of the invention.

What is claimed is:

1. A vehicle comprising:
    a vehicle prime mover;
    an air brake system including a compressed air supply operated by the prime mover,
    a pressure sensor communication with the compressed air supply for providing air pressure readings for regulating the compressed air supply;
    an air clutched power take off unit having a drive input connected to the prime mover and an air input, the air clutched power take off unit having engaged and disengaged states with the disengaged state being a default operational state, the air clutched power take off unit assuming an engaged state in response to the application of compressed air from the compressed air supply to the air input;
    a valve connected between the compressed air supply and the air clutched power take off unit air input for applying and releasing the application of compressed air to the air clutched power take off unit resulting in the air clutched power take off unit assuming the engaged and disengaged states, respectively;
    means for generating a power take off request signal;
    a body controller coupled to receive the air pressure readings and the power take off request signal and for generating an engaged state valve position control signal in response to the power take off request signal when the air pressure readings indicate air pressure exceeds a minimum value and for generating a disengaged state valve position control signal otherwise; and
    a valve controller responsive to the engaged state valve position control signal for controlling the position of the valve to place the air clutched power take off unit in the engaged state and responsive to the second state valve position control signal for positioning the valve to allow the air clutched power take off unit to return to the default operational state.

2. A vehicle as set forth in claim 1, wherein the means for generating a power take off request signal is an operator controlled switch.

3. A vehicle as set forth in claim 2, wherein the valve controller includes a body controller and a solenoid connected to the body controller for receiving the valve position control signal.

4. A vehicle as set forth in claim 2, wherein the body controller is programmed to provide different first lower minimum in air pressure readings for disengagement of the air powered take off unit on falling pressure readings and a second higher minimum in air pressure readings for engagement of the air powered take off unit on rising air pressure readings.

5. A control system for an air clutched power take off unit having an engaged operational state and a default disengaged operational state where the air clutched power take off unit is installed on a motor vehicle having an air brake system, the control system comprising:
    a compressed air supply for the air brake system;
    a pressure sensor communicating with the compressed air supply for providing air pressure readings for controlling pressurization of the compressed air supply;
    a source of a power take off request signal;
    a valve connected between the compressed air supply and the air clutched power take off unit for applying and releasing the application of compressed air on the air clutched power take off unit resulting in the air clutched power take off unit assuming a selected one of the engaged and the default disengaged operational states;
    a programmable body controller coupled to receive the power take off request signal and the air pressure readings, programmable body controller being responsive to the power take off request signal and the air pressure readings for providing a valve position control signal to the valve controller for controlling engagement and disengagement of the air clutched power take unit, the valve position control signal providing for engagement of the air clutched power take off unit only in response to a power take off request signal and air pressure readings exceeding a programmed minimum level;
    a valve controller responsive to the valve position control signal for controlling the position of the valve to place the air clutched power take off unit in the selected operational state.

6. A control system as set forth in claim 5, wherein an operator controlled switch provides the power take oft request signal.

7. A control system as set forth in claim 6, wherein the valve controller includes a body controller and a solenoid connected to the body controller for receiving a valve position control signal.

8. A control system as set forth in claim 6, wherein the programmable body controller is programmed to provide different first lower minimum in air pressure readings for disengagement of the air powered take off unit on falling pressure readings and a second higher minimum in air pressure readings for engagement of the air powered take off unit on rising air pressure readings.

* * * * *